United States Patent [19]

Stove et al.

[11] Patent Number: 4,633,253
[45] Date of Patent: Dec. 30, 1986

[54] MOVING TARGET INDICATION SYSTEM

[75] Inventors: Andrew G. Stove, Reigate; Richard P. Vincent, Horsham, both of England

[73] Assignee: U.S. Philips Corporation, New York, N.Y.

[21] Appl. No.: 514,226

[22] Filed: Jul. 15, 1983

[30] Foreign Application Priority Data

Jul. 16, 1982 [GB] United Kingdom ............... 8220704

[51] Int. Cl.[4] ..................... G01S 13/54; G01S 13/34
[52] U.S. Cl. .................................. 342/162; 342/128
[58] Field of Search ............ 343/7.7, 5 FT, 14, 5 PD, 343/5 SA, 9 R

[56] References Cited

U.S. PATENT DOCUMENTS

| | | | |
|---|---|---|---|
| 2,612,636 | 9/1952 | Rust et al. | 343/9 |
| 2,638,586 | 5/1953 | Guanella | 343/9 |
| 3,149,326 | 9/1964 | Naidich | 343/9 |
| 3,225,349 | 12/1965 | Thor | 343/7.7 |
| 3,866,223 | 2/1975 | Crooke | 343/17.2 PC |
| 3,905,033 | 9/1975 | Moore et al. | 343/7.7 |
| 3,967,283 | 6/1976 | Clark et al. | 343/5 PD X |
| 4,096,478 | 6/1978 | Chavez | 343/7.7 |

FOREIGN PATENT DOCUMENTS

| | | | |
|---|---|---|---|
| 149060 | 12/1951 | Australia | 343/14 |
| 1589779 | 5/1981 | United Kingdom | 343/7.7 |

OTHER PUBLICATIONS

Carr et al., *Digital Signal Processing for Target Detection in FMCW Radar*, IEEE Proc., vol. 128, Pt. F., No. 5, Oct. 1981, pp. 331-336.
Ravdonat et al, Abstract-The German Reference.

*Primary Examiner*—T. H. Tubbesing
*Assistant Examiner*—Gilberto Barrón, Jr.
*Attorney, Agent, or Firm*—Robert J. Kraus

[57] ABSTRACT

In order that it should respond satisfactorily to substantially all moving targets within range (without exhibiting "blind speeds") and ignore all stationary targets, a moving target indication system comprises an FM continuous wave radar system in the form of an oscillator (1) the output frequency of which is swept by the output signal of a triangular-wave generator (19). The oscillator output signal is fed to an aerial (3) via a circulator (4) and also to a first input (6) of a mixer (7) a second input (8) of which is supplied with the return signal from the aerial. The respective output waveforms of the mixer occurring for sweeps of the oscillator frequency in the two directions are, in a further circuit (11), subtracted one from the other after effectively time-reversing one of them, and the resulting difference waveform is analyzed in a Fast Fourier Transform calculating circuit (15). The triangular-wave generator (19) may be replaced by a sawtooth-wave generator, in which case the effective time-reversal in the further circuit (11) should be omitted.

3 Claims, 6 Drawing Figures

MOVING TARGET INDICATION SYSTEM

BACKGROUND OF THE INVENTION

This invention relates to a moving target indication system.

Frequency-modulated continuous wave radar systems are known. Such systems normally comprise a variable frequency oscillator the output of which is coupled to an aerial, means for repeatedly sweeping the output frequency of the oscillator between first and second values, a mixer circuit having a first input to which the output of the oscillator is coupled and having a second input to which an aerial is coupled, and a signal processing arrangement having an input to which the output of the mixer circuit is coupled. If the oscillator output signal transmitted by the aerial should be reflected back by a stationary target and fed to the second input of the mixer, and if the sweeps of the oscillator output frequency are linear, the mixer produces an output beat frequency signal (constant IF sweep end effects being neglected) the frequency of which is proportional to the target range. In such systems the signal processing arrangement, for example a multiple filter, separates the mixer output signal into its component frequencies to provide a read-out indicative of the various ranges at which reflecting targets are present. If on the other hand a given target is moving towards or away from the system the respective output frequency of the mixer will gradually decrease or increase respectively. Moreover, if the sweeps of the output frequency of the oscillator are in an upward direction the respective mixer output frequency will in these circumstances be lower or higher, respectively, at any given time than it would be if the target were stationary at the same range, because the frequency of the return signal will be higher or lower, respectively, than it would otherwise be, due to the Doppler effect. Such a system could be arranged to distinguish between a stationary target at a given range and a moving target at a different range by observing the relevant output frequency of the mixer over a period of time which is sufficient to allow the change in frequency with target range to become apparent. However, such a period of time can be considerable, particularly with relatively slowly-moving targets, which makes the use of such a method as the basis of a moving target indicator impracticable.

If, instead of repeatedly sweeping the oscillator frequency in an upward direction, sweeps in a downward direction are employed then, if a target is moving towards or away from the system, the mixer output frequency will, due to the Doppler effect, be higher or lower, respectively, than it would be if the target were stationary at the same range, i.e. it will be shifted in the opposite sense to the shift occurring with sweeps in the upward direction. Thus sweeping the oscillator frequency first in one direction and then in the other and averaging the spectra of the two resulting output signals from the mixer enables the effects of the Doppler shifts to be eliminated (although this becomes increasingly difficult for higher values of Doppler shift, i.e. Doppler shifts which are sufficiently large to become comparable with the output frequency of the mixer which would be obtained for a stationary target at the same range). This fact is known (see, for example, the book "Radar Handbook" edited by M. I. Skolnik, page 16-26 (1970)). If instead of averaging the spectral components lying within each of successive frequency ranges for the two sweeps their differences were calculated, then the existance of a non-zero result would theoretically indicate that the relevant pair of components relates to a moving target. However, if such a non-coherent system, i.e. a system in which only the moduli of the signals in each range cell are considered, not their phases, were used as the basis for a moving target indicator then, because in practical situations there is a great deal of "clutter" in the return signals, the presence of a small moving target very likely would be masked by a large clutter target. In addition such a system would completely fail to detect a moving target if the target did not move into a different range cell between one sweep and the next and there were no clutter in the relevant cell with which to compare it.

SUMMARY OF THE INVENTION

It is an object of the invention to mitigate the above disadvantages in a system employing a frequency-modulated continuous wave technique.

According to one aspect the invention provides a moving target indication system comprising a variable-frequency oscillator the output of which is coupled to an aerial, means for repeatedly sweeping the output frequency of the oscillator from a first value to a second value, a mixer circuit having a first input to which the output of the oscillator is coupled and having a second input to which an aerial is coupled, and a signal storage and processing arrangement having an input to which the output of the mixer circuit is coupled. The signal storage and processing arrangement comprises means for producing an output signal which is representative of the waveforms (if any) which would be obtained by subtracting from each other the input waveforms to the arrangement arising from successive sweeps of the oscillator frequency from the first value to the second value. (The aerial to which the oscillator output is coupled and the aerial which is coupled to the first input of the mixer may, of course, be one and the same).

It has now been recognized that subtracting from each other the mixer output waveforms obtained for, for example, two immediately succeeding sweeps of the oscillator frequency from the first value to the second value gives rise to a resulting difference waveform which is, for a single reflecting target, in the form of an amplitude-modulated carrier the frequency of which changes linearly with time from a value which corresponds to the range of the target half-way through the first of the two sweeps to a value which corresponds to the range of the target half-way through the second of the two sweeps. The amplitude modulation of this carrier is of constant frequency and contains velocity information about the target. Such a carrier is always present except when the radial velocity of the target (towards or away from the system) is zero, i.e. such a system offers a reduced likelihood of exhibiting the "blind speeds" which are liable to occur with other forms of moving target indicator. Moreover, because such a system is a coherent one it can be less susceptible to the effects of clutter than the simple system postulated in the preamble. If more than one moving target is present then, of course, the difference waveform will consist of the various corresponding modulated carriers superimposed on each other, and can be separated into its various components by, for example, a Fast Fourier Transform calculating circuit.

Although in such a system the carrier is always present except when the radial velocity of the target is zero and, if the energy of the corresponding spectral component is plotted as a function of the target velocity a curve is obtained which rises steeply from zero at zero velocity and then tends towards the horizontal as ideally required, the "horizontal" portion is found to contain an appreciable amount of ripple. This ripple may, under sufficiently adverse conditions, cause the corresponding carrier amplitudes to be so low that they become masked by clutter etc., so that "blind speeds" in fact occur under these conditions. In order to mitigate this disadvantage, according to another aspect the invention provides a moving target indication system comprising a variable-frequency oscillator the output of which is coupled to an aerial, means for repeatedly sweeping the output frequency of said oscillator in alternating directions between first and second values, a mixer circuit having a first input to which the output of the oscillator is coupled and having a second input to which an aerial is coupled, and a signal storage and processing arrangement having an input to which the output of the mixer circuit is coupled. The signal storage and processing arrangement comprises means for producing an output signal which is representative of the waveforms (if any) which would be obtained by subtracting from each other the input waveforms to the arrangement arising from sweeps of the oscillator frequency between the first and second values is one direction and the input waveforms to the arrangement arising from sweeps of the oscillator frequency between the first and second values in the other direction after the latter input waveforms have been put into time-reversed form.

This other aspect of the invention can give rise to similar advantages to those set forth previously herein, the resulting difference waveform in this case being in the form of an amplitude-modulated carrier the frequency of which is constant (neglecting sweep end effects) and corresponds to the range of the target and the modulation of which contains velocity information about the target and has a frequency which varies linearly with time. Moreover, if the energy of the corresponding spectral component is plotted as a function of the target velocity a curve is obtained in this case which is similar to that obtainable according to the one aspect of the invention but in which the ripple is much reduced, thus further reducing the likelihood of the system exhibiting blind speeds.

It has been assumed in the above discussions of the two aspects of the invention that each sweep of the oscillator frequency between the first and second values is of the same duration. This is not essential provided that, if this is not the case, the signal storage and processing arrangement processes its input waveforms in such manner as to effectively adjust the scale of their time-axes to make their durations the same. It has been assumed, furthermore, that each sweep of the oscillator frequency is linear. Again this is not essential, although non-linearity will give rise to some modification of the difference waveform. If non-linearity is present then, when all the sweeps are in the same direction, each should exhibit substantially the same non-linearity and, when the senses of the said sweeps alternate, each sweep in one sense should be, at least to within a time scale factor (see above), the mirror-image of each sweep in the other direction.

A particularly simple construction for the signal processing arrangement results if it comprises signal sampling, storing and differencing means for periodically sampling the input waveforms to the arrangement arising from alternate sweeps of the oscillator frequency, storing the samples thus taken, correspondingly periodically sampling the input waveforms to the arrangement arising from the other sweeps of the oscillator frequency, and calculating the differences between the samples taken for each other sweep and the stored samples taken for the immediately preceding sweep in such manner that each difference is calculated from samples which arose from the same frequency being applied to the first input of the mixer, and Fast Fourier Transform calculating means for processing the differences.

Processing of the mixer output waveform can be simplest if the oscillator frequency sweeps are linear. Preferably, therefore, the means for repeatedly sweeping the oscillator output frequency comprises a sawtooth-wave or triangular-wave generator the output of which is coupled to a frequency control input of the oscillator.

BRIEF DESCRIPTION OF THE DRAWING

Embodiments of the invention will now be described, by way of example, with reference to the accompanying diagrammatic drawings in which.

DESCRIPTION OF THE PREFERRED EMBODIMENTS

Figure 1:
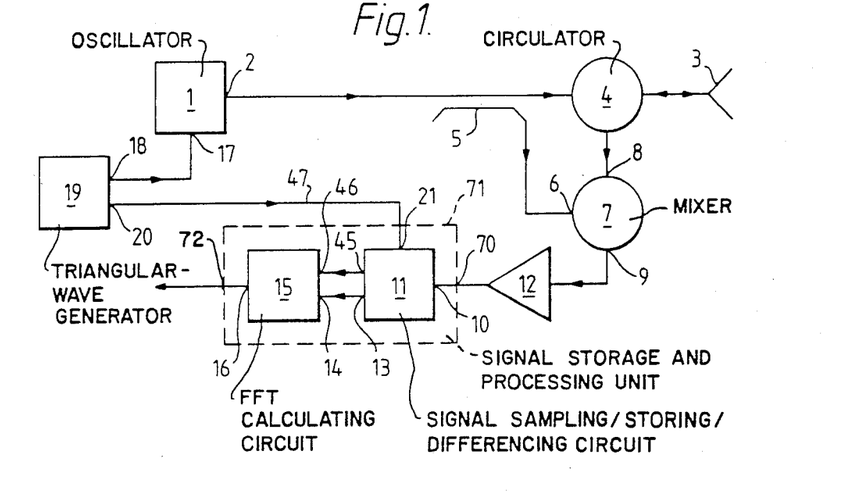
FIG. 1 is a block diagram of a first embodiment.

In FIG. 1 a moving target indication system comprises a variable-frequency (in this case voltage-controlled) RF oscillator 1 which operates, for example, in the gigahertz range and the output 2 of which is coupled to an aerial 3 via a circulator 4. Part of the output signal of the oscillator is taken off by means of a directional coupler 5 and fed to a first input 6 of a mixer circuit 7. The aerial 3 is coupled to a second input 8 of the mixer circuit 7 via the circulator 4. The output 9 of the mixer circuit 7 is coupled to an input 70 of a signal storage and processing arrangement 71 via an amplifier 12. The arrangement 71 comprises a signal sampling, storing and differencing circuit 11 having an input 10 to which the input 70 is connected, and a Fast Fourier Transform calculating circuit 15 (examples of which are known) having an input 14 to which the output 13 of the circuit 11 is coupled. Circuit 15 has an output 16 which is connected to the output 72 of the arrangement 71. A control input 46 of circuit 15 is fed from a further output 45 of circuit 11. A frequency control input 17 of the oscillator 1 is fed from the output 18 of a triangular-wave generator 19; the durations T of the upward and downward sweeps of the output signal of generator 19 may each be, for example, 80 μs. A further output 20 of generator 19 is coupled to a control input 21 of the circuit 11 via a coupling 47.

In operation the aerial 3 is fed by oscillator 1 with a carrier wave which is frequency-modulated by the triangular-wave output of generator 19; the output frequency of oscillator 1 repeatedly and linearly sweeps in alternating directions between first and second values which lie in the gigahertz range and which may be, for example, 30 MHz different from each other. If the electromagnetic signal from aerial 3 should be reflected back to the aerial by a stationary object at a range R then, as is known in the context of FM radar systems, a beat or difference frequency signal results at the output 9 of mixer 7, the frequency of this signal being equal to $2Ra/c$ where a is the rate of change of the output frequency of oscillator 1 and c is the velocity of light. Thus, if the circuit 11 were replaced by a direct connection between its input 10 and its output 13 the Fast Fourier Transform calculating circuit 15 would produce an output signal indicating a spectral component at a frequency $2Ra/c$ under these circumstances. If, on the other hand, the object is not stationary but is moving away from the aerial 3 with a velocity v then, the other circumstances being the same, the output signal of the circuit 15 would indicate spectral components extending in a continuous manner over the frequency range $2Ra/c$ to $2(R+vt_1)a/c$, where $t_1$ is the length of the time period over which the object is sensed by the system. As the system is required to indicate only moving objects the circuit 11 is in fact included, this circuit being constructed to produce a signal at its output 13 which is representative of the waveforms (if any) which would be obtained by subtracting from each other the waveforms applied to its input 10 arising from sweeps of the output frequency of oscillator 1 in one direction and the waveforms applied to its input 10 arising from sweeps of the output frequency of oscillator 1 in the other direction after these latter waveforms have been put into time reversed form. More particularly, the circuit 11 is constructed to take and store successive samples of the waveforms applied to its input 10 arising from sweeps of the output frequency of oscillator 1 in one direction and, each time a waveform is applied to its input 10 arising from a sweep in the output frequency of oscillator 1 in the opposite direction, to also take successive samples of this latter waveform and subtract from them the stored samples of the waveform which arose from the immediately preceding frequency sweep in such manner that each sample so subtracted arose from the same output frequency of oscillator 1 being applied to input 6 of mixer 7 as does the sample from which it is being subtracted. In effect, therefore, the circuit 11 produces (in the form of samples) an output waveform which is equal to any difference there might be between the waveforms applied to its input 10 for successive (oppositely-directed) sweeps of the output frequency of oscillator 1 after one of these input waveforms has been time-reversed. That this results in an input signal of the required kind being applied to circuit 15 can be demonstrated as follows.

If R, a and c have the meanings previously assigned to them, if each sweep of the output frequency of oscillator 1 occurs at the same rate and takes a time T, if the lower limit of each frequency sweep is F and if the instantaneous output frequency of oscillator 1 is f (corresponding to a free-space wavelength L) then at any given time the total path length between the aerial 3 and the reflecting object is $2R/L$ wavelengths. Thus the standing phase of the return signal is $4\pi R/L = 4\pi Rf/c$ and the output signal of mixer 7 may be written as sin $4\pi Rf/c$ (assuming unity amplitude for simplicity). During an upward frequency sweep the output waveform of mixer 7 is therefore sin $4\pi(R+vt)(F+at)/c$ and during a downward frequency sweep the corresponding output waveform in time-reversed form is sin $4\pi(R+vT+v(T-t)(F+aT-a(T-t)/c=$ sin $4\pi(R+2vT-vt)(F+at)/c$. The difference between these two expressions may be written as 2 cos $(2\pi(2R+2vT)(F+at)/c)$ sin $2\pi(2vt-2vT)(F+at)/c$, from which it will be seen that the output waveform of circuit 11 corresponding to each pair of frequency sweeps of the output signal of oscillator 1 is an amplitude-modulated carrier wave which is always present except when $v=0$, i.e. except for stationary targets, and the frequency of which corresponds to the range of the reflecting object at the end of the first sweep of the pair. The frequency of the modulation varies linearly with time t and is proportional to the radial velocity of the target. Thus the output signal of the Fast Fourier Transform calculating circuit 15 will, after each complete difference waveform has been supplied to it, indicate a well-defined band of spectral components around the frequency corresponding to the distance of the reflecting object from the aerial 3 at the end of the first of the two relevant frequency sweeps if and only if that object has a velocity component to or from the aerial 3. The energy of this component will be proportional to the signal input power to the circuit 15 at the carrier frequency, i.e. to $$\int_0^T \sin^2 4\pi v(t-T)(F+at)/c \cdot dt.$$

If this integral is evaluated for various values of v while taken practical values for T,F and a a curve is obtained which rises steeply from zero at $v=0$ to a specific value from which it deviates only a small amount as v is increased still further. It will be appreciated that such a curve, and a corresponding sharp spectral component, is substantially exactly that which is ideally required.

As an alternative the generator 19 may be a sawtooth-wave generator, so that each sweep of the output frequency of oscillator 1 occurs in the same direction, and the circuit 11 may be arranged to produce in a substantially similar manner an output waveform equal to the difference between the output waveforms from the mixer 7 occurring for pairs of successive sweeps (without time-reversing one of these latter waveforms). If this is the case the output signal from the circuit 11 will be 2 cos $(2\pi(2R+2vt+vT)(F+at)/c)$ sin $2\pi vT(F+at)/c$, i.e. an amplitude-modulated carrier wave which is again always present except when $v=0$. The frequency of this wave changes linearly with time from a frequency which corresponds to the range of the reflecting object half-way through the first of the two frequency sweeps to a frequency which corresponds to the range of the reflecting object half-way through the second of the two frequency sweeps. However the energy of the corresponding spectral component indicated by the Fast Fourier Transform calculating circuit 15 will now be proportional to $$\int_0^T \sin^2 2\pi vT(F+at)/c \cdot dt.$$

If this integral is evaluated in a similar manner to the corresponding integral in the previously considered situation it is found that not nearly such an ideal curve is obtained; appreciable ripple occurs on the ideally perfectly horizontal part of the curve and, if such a system were used it would be liable under adverse operating conditions to be effectively "blind" to moving objects having certain specific velocities relative to the aerial 3. It is therefore preferred that the generator 19 is a triangular-wave generator and that the circuit 11 is constructed accordingly.

Figure 2A:
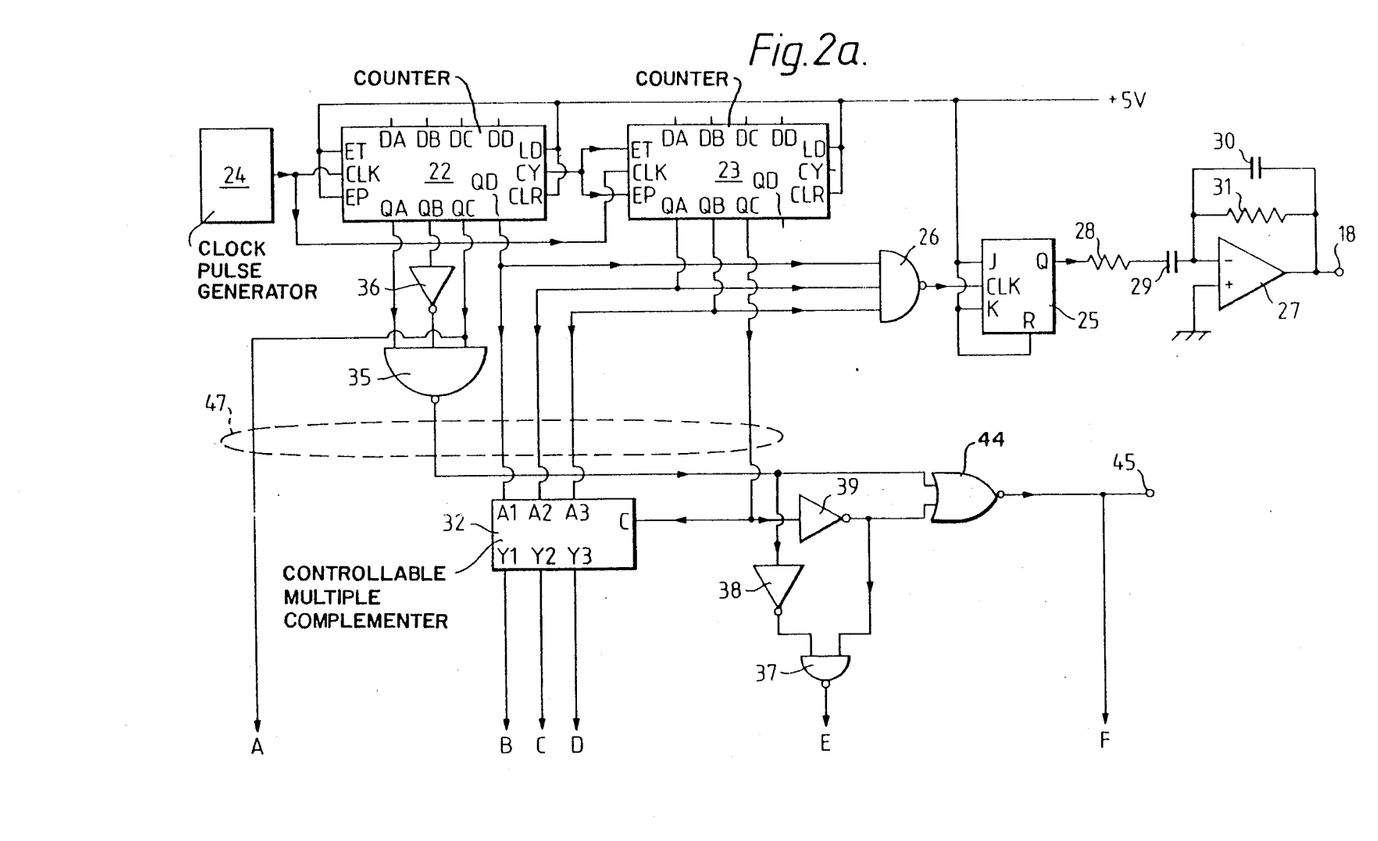
FIGS. 2a and 2b show a possible construction for part of the embodiment of FIG. 1 in detail.
Figure 2B:
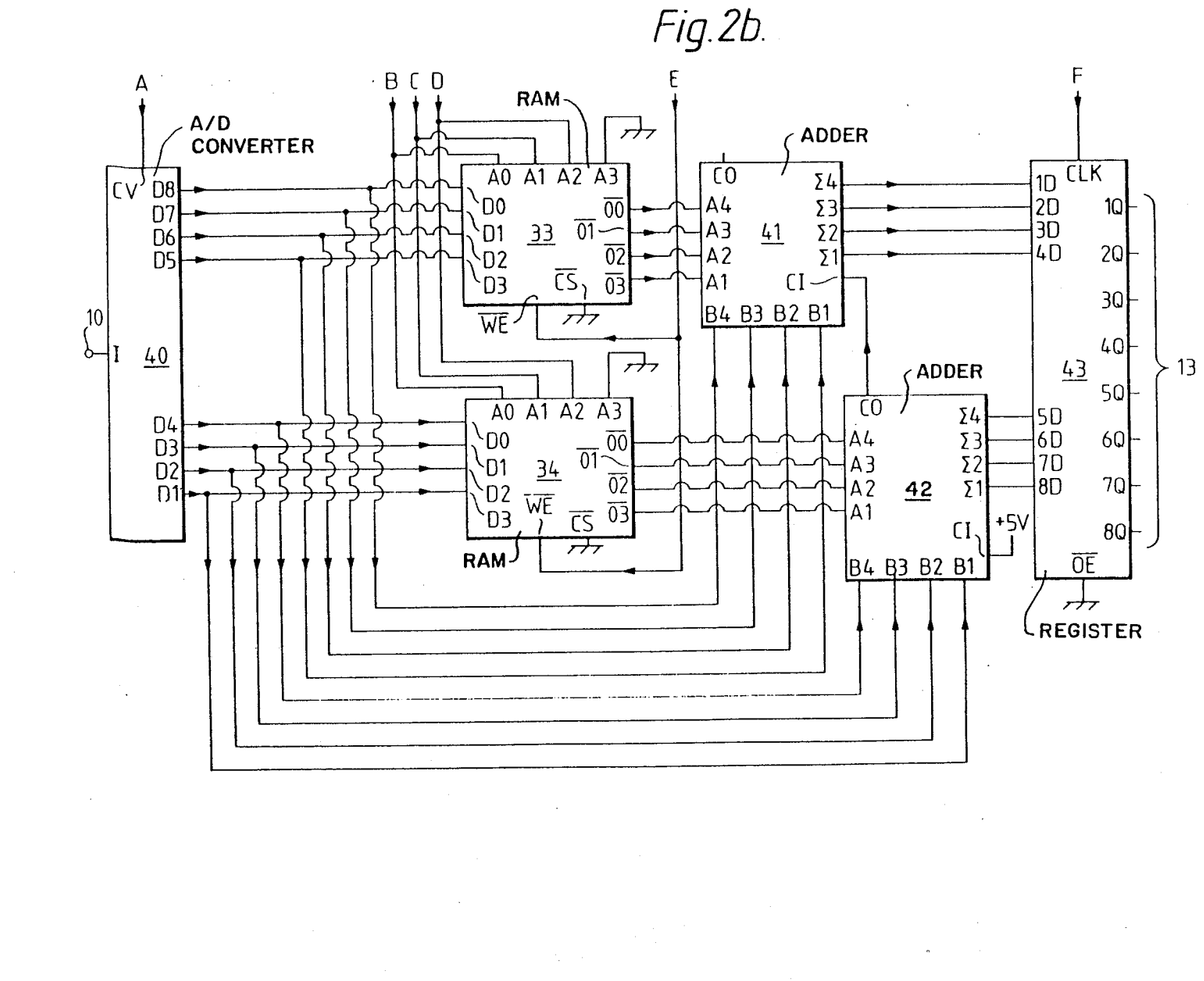

FIGS. 2a and 2b collectively a possible construction for the signal sampling, storage and differencing circuit 11 and generator 19 of FIG. 1 if generator 19 is a triangular-wave generator, the various inputs and outputs of these two components being given the same reference numerals in the two Figures. The aforesaid triangular-wave generator is formed by a pair of cascade-connected 4-bit counters 22 and 23 the clock inputs CLK of which are fed from the output of a clock pulse generator 24. The "carry" output CY of counter 22 is connected to the "count enable trickle" and "count enable parallel" inputs ET and EP respectively of counter 23 and the terminals ET and EP of counter 22 are connected to logic "1" (approximately plus 5 volts) as are the (active low) "load" (LD) and "clear" (CLR) inputs of both counters. Neither the most significant bit output QD nor the carry output CY of counter 23 is used, so the counters 22 and 23 together form a 7-bit counter 22, 23. The most significant bit output QD of counter 22 and the two least significant bit outputs QA and QB of counter 23 are coupled to the clock input CLK of a J-K flip-flop 25 via a NAND gate 26. The J and K inputs of flip-flop 25 are connected to logic "1" as is its (active low) reset input R so that it operates in the "toggle" mode; its Q-output changes state each time its clock input changes from high to low, i.e. each time the count in counter 22, 23 becomes 56 or 120 (0001110 or 0001111). The Q-output of the flip-flop 25 is coupled to the input of an integrator circuit comprising an operational amplifier 27 to the inverting input of which the Q-output is connected via the series arrangement of a resistor 28 and a capacitor 29 and the output of which is connected to the inverting input via the parallel arrangement of a capacitor 30 and a resistor 31. The non-inverting input of amplifier 27 is connected to ground and its output is connected to the terminal 18 of FIG. 1. Thus each time the Q-output of flip-flop 25 goes high a negative-going ramp starts at terminal 18 and each time the Q-output goes low a positive-going ramp starts at terminal 18. (The linearity of these ramps is in fact slightly degraded by the presence of the components 29 and 31). In other words a substantially triangular signal appears at the terminal 18, the discontinuities in this signal coinciding with the instants at which the count in counter 22, 23 becomes 56.

The outputs QD of counter 22 and QA and QB of counter 23 are also connected to inputs A1, A2 and A3 respectively of a controllable multiple inverter or complementer 32 the control input C of which is fed from the output QC of counter 23. The corresponding outputs Y1, Y2 and Y3 of controllable multiple complementer 32 are connected to address bit inputs A0, A1 and A2 respectively of two random access memories (RAMs) 33 and 34 which each comprise sixteen 4-bit storage locations. The RAMs 33 and 34 thus effectively constitute a single RAM comprising sixteen 8-bit storage locations addressed by the output of complementer 32 although, as the address bit inputs A3 of the RAMs 33 and 34 are both connected to ground, only eight of these locations are actually used. Because the control input C of complementer 32 is fed from the output QC of counter 23 the sequence of digital numbers 0-7 which repeatedly appears at the output QD of counter 22 and QA and QB of counter 23 as the counter 22, 23 is clocked is applied to the address inputs of the RAMs 33 and 34 in alternately non-reversed and reversed form. Thus the eight used locations in the RAMs 33 and 34 are addressed alternately in a given order and in the reverse order.

A NAND gate 35 is fed from the outputs QA and QC of the counter 22 directly and from the output QB thereof via an inverter 36. Thus the output of gate 35 is low each time the digital number at these outputs QA, QB and QC is five (101). A NAND gate 37 is fed from the output of gate 35 via an inverter 38 and from the output QC of counter 23 via an inverter 39, and itself feeds the (active low) write-enable inputs $\overline{WE}$ of the RAMs 33 and 34. Thus RAMs 33 and 34 are fed with a write-enable pulse at an instant (when the digital number at outputs QA, QB and QC is five) within each period during which the address applied to their address inputs has taken on a new value while the used locations therein are being addressed in the aforesaid given order but not while they are being addressed in the aforesaid reverse order. In other words the RAM locations are alternately written into in one order and read out in the reverse order.

The data inputs D0-D3 of the RAMs 33 and 34 are fed from respective bit-outputs D1-D8 (where D8 is the most significant bit) of an analog-to-digital converter 40 the analog input I of which is connected to the terminal 10 of FIG. 1. The "convert command" input CV of converter 40 is fed from the output QC of counter 22, so that a new conversion is carried out just before each instant that the output of gate 35 goes low (and RAMs 33 and 34 are written into when their storage locations are being addressed in one of the two possible orders). Converter 40 is a so-called "flash converter" and, each time a convert command is applied to it, it takes in a sample of the signal at its input 10 and then outputs the converted sample taken immediately previously, so that its output signal corresponds, at any given time, not to the immediately preceding sample taken but to the sample which preceded it. The RAMs 33 and 34 are always operative, their (active low) chip-select inputs $\overline{CS}$ being connected to ground, and their inverting data outputs $\overline{00}$-$\overline{03}$ are connected to respective first bit inputs A4-A1 of full adders 41 and 42, respectively. The second bit inputs B4-B1 of the adders 41 and 42 are fed from respective ones of the bit outputs D8-D1 of the converter 40, and the carry input $\overline{CI}$ of the adder 41 is fed from the carry output CO of the adder 42. The carry input CI of the adder 42 is connected to logic "1" (the adders 41 and 42 operate in the active low or negative logic mode). Because of the inversion occurring in the RAMs 33 and 34 the 8-bit number appearing at any time at the outputs Σ4-Σ1 of the adders 41 and 42 is equal to the difference between the number currently appearing at the output D8-D1 of converter 40 and the eight-bit number which was previously written into the currently addressed storage location in the RAM 33,34. The outputs Σ4-Σ1 are fed to the output 13 of FIG. 1 via a positive-edge-triggered multiple D-type flip-flop or register 43 the (active low) output-enable terminal $\overline{DE}$ of which is connected to ground and the clock input CLK of which is fed from a NOR gate 44. The NOR gate 44 is fed from the outputs of the gate 35 and the inverter 39. Thus, if the time lag which has been incorporated to allow for the operation of converter 40 is ignored, effectively information is written into the register 43 and a "data available" signal (for use by the Fast Fourier Transform calculating circuit 15 of FIG. 1) appears at an output 45 each time the digital number at the outputs QA, QB and QC of counter 22 becomes five while the locations in RAM 33,34 are being addressed in one order (in which situation write-enable pulses are not applied to the RAM 33,34) but not while these locations are being addressed in the other order (in which situation write-enable pulses are applied to the RAM 33,34). Because the triangular wave at the output 18 is derived in the manner described from the output of the counter 22,23, samples of the signal at input 10 are written into the RAM 33,34 while the ramp at the output 18, and hence the output frequency of oscillator 1 of FIG. 1, is varying in one direction, and these samples are read out in the reverse order, subtracted from samples of the new signal at input 10, and written into the register 43 while the ramp at output 18, and hence the output frequency of oscillator 1, is varying in the other direction. Thus during every second sweep of the output frequency of oscillator 1 a succession of (eight) digital signals appears at the output 13, these samples being measures of the differences between samples of the waveform currently appearing at the input 10 and corresponding samples of the time-reversed waveform which appeared at the input 10 during the immediately preceding (oppositely directed) sweep of the output frequency of oscillator 1, as required.

The clock generator 24 may, for example, have an output frequency of 800 KHz, giving a sampling rate in A/D converter 40 of 100K samples per second, durations of the rising and falling ramps at output 18 of 80 μS each, and an average data rate in the Fast Fourier Transform calculating circuit 15 of 50K bytes/sec (in 80 μS bursts at 100K bytes/sec). In this case a low-pass filter having a cut-off frequency of 50 KHz should obviously be included between the outputs 9 of mixer 7 and the input 10 of arrangement 11. In order to give a sub-clutter visibility of, for example, approximately 20 dB the group delay of the signal at input 10 should be arranged to be less than 150 nS.

The various components of FIG. 2 may be of the following types or values:

Counters 22 and 23—74LS163
RAMs 33 and 34—7489
Adders 41 and 42—74283
Register 43—74LS374
Converter 40—TDC1007
Complementer 32—¾ of 74H87
Inverters 36,38,39—Each 1/6 of 7404
NAND gates 26, 35—Each ⅓ of 7410
NAND gate 37—¼ of 7400
NOR gate 44—¼ of 7402
JK flip-flop 25—½ of 7473
Amplifier 27—NE 536
Resister 28—100K ohms
Resister 31—10M ohms
Capacitor 29—6.8 μF
Capacitor 30—10 nF.

If desired the efficiency of the circuit of FIG. 2 may be doubled by providing duplicates of the memories 33 and 34 to allow writing into one set while reading out the other. Moreover the number of samples taken in each frequency sweep may be increased if desired by increasing the size of the counter 22,23 (increasing the number of bits between outputs QD of counter 22 and QB of counter 23) to generate more addresses and increasing the width of complementer 32 and the number of locations used in RAM 33,34 accordingly (if necessary adding more RAM). If this is done the NAND gate 26 will obviously have to be provided with a further input corresponding to each further address bit employed and connected to the relevant output of counter 22, 23.

Figures 3A, 3B:
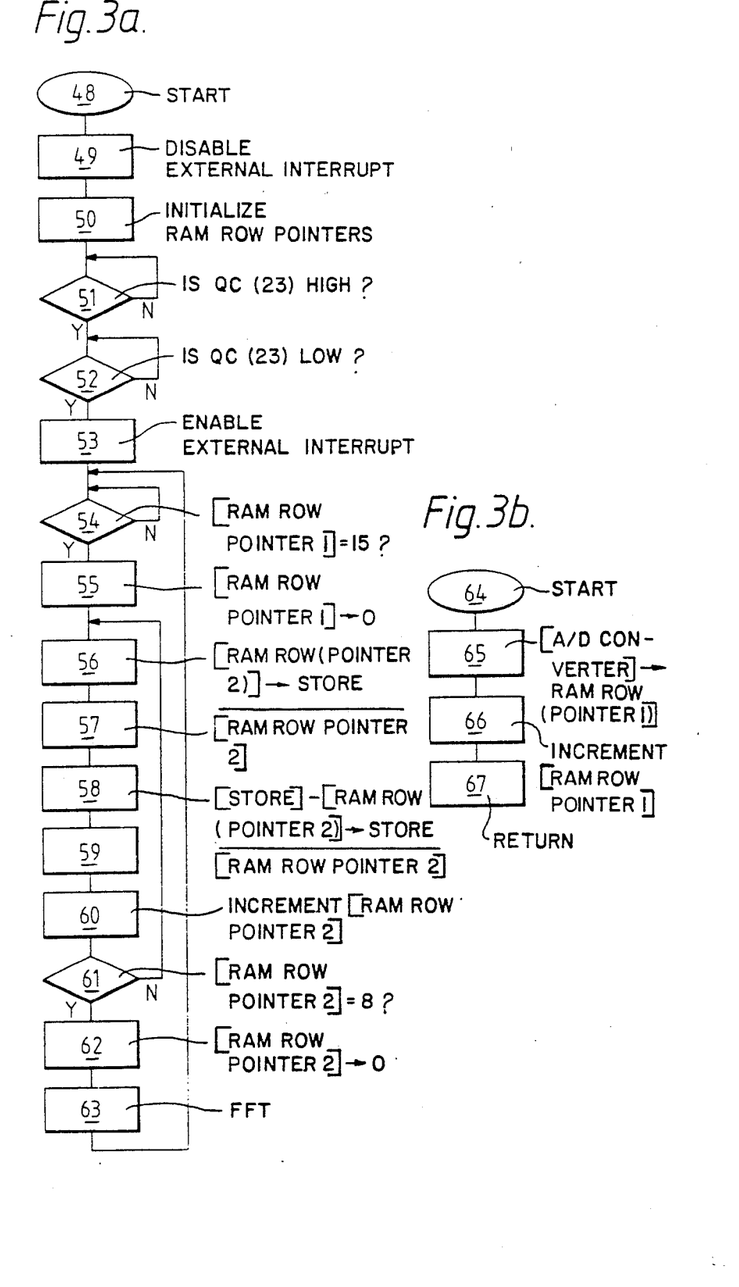
FIGS. 3a and 3b are flow charts relating to an alternative to the construction shown in FIG. 2.

As an alternative to employing the construction of FIGS. 2a and 2b, the functions of the signal sampling, storage and differencing circuit 11 of FIG. 1 may be carried out by a suitably programmed computer, which may also perform the function of the Fast Fourier Transform calculating circuit 15. To this end the components 32-34, 37-39 and 41-44 together with the circuit 15 may be replaced by such a computer, an 8-bit input port of which is connected to the output of A/D converter 40, a second port of which constitutes the output 13, a further input (for example a single bit portion of the second port if this is capable of acting as both an input and an output port) of which is connected to the output QC of counter 23, and a low-transition-sensitive external interrupt input of which is connected to the output of NAND gate 35. Such a computer may include a RAM in the form of an array of sixteen rows of eight single-bit storage locations provided with two row pointers, in which case it may be programmed to perform the sequence of operations shown in the flow charts of FIGS. 3a and 3b. The various blocks of FIG. 3a constitute the main program and have the following significances:

48—Start
49—Disable external interrupt
50—Set RAM row pointers 1 and 2 to zero
51—Is output QC of counter 23 high?
52—Is output QC of counter 23 low? (Has new frequency sweep of output of oscillator 1 just started?)
53—Enable external interrupt
54—Does RAM row pointer 1 point to row 15?
55—Reset RAM row pointer 1 to zero
56—Read information from RAM row pointed to by pointer 2 and store
57—Complement RAM row pointer 2
58—Subtract information in RAM row pointed to by pointer 2 from information just stored in step 56 and store result
59—Complement RAM row pointer 2
60—Increment RAM row pointer 2
61—Does RAM row pointer 2 point to row 8?
62—Reset RAM row pointer 2 to zero
63—Perform Fast Fourier Transform on the data stored in the eight previous steps 58 and output result on the second port.

The various blocks of FIG. 3b constitute the interrupt routine and have the following significances:

64—Start
65—Read the information at the input port, i.e. the information at the output of A/D converter 40 into the RAM row pointed to by pointer 1
66—Increment RAM row pointer 1
67—Return.

Programs for performing Fast Fourier Transforms on groups of data representing samples of an input waveform are known, and it is assumed that this sequence of operations (block 63 of FIG. 3a) together with steps 55-62 of FIG. 3a (steps 56-61 being performed eight times) and fifteen sequences of steps 64-67 of FIG. 3b take less time than does the combination of an upward sweep and a downward sweep of the output frequency of oscillator 1 of FIG. 1. Moreover, it is assumed that steps 55-61 of FIG. 3a performed eight times take less time than does an upward or downward sweep of the output frequency of oscillator 1. Of course the functions of the components 22, 23, 26, 35 and 36 of FIG. 2 may also be performed by such a programmed computer if desired.

It will be appreciated that the systems described may be modified in a multitude of ways. For example, the output waveform of generator 19 need not be triangular. It may, as a first alternative, be in the form of a succession of alternately rising and falling linear ramps each of which is separated from the next by a horizontal or dwell portion, in which case the output frequency of the circuit 15 will correspond to the range of the target midway between the two sweeps from which it is derived. As a second alternative its rising and falling portions may be non-linear (possibly again separated by dwell portions), provided that the falling portions are mirror images of the rising portions, at least to within a time scale factor. In all cases, however the samples of the output waveform of mixer 9 taken during an oscillator frequency sweep in one direction should each correspond to the same frequency being applied to the mixer input 6 as does the equivalent sample taken during the oscillator frequency sweep in the other direction. If the rising and falling portions of the output signal of generator 19 are non-linear then obviously the arrangement 71 will have to process its input signals in such a way as to compensate for this fact, for example by arranging that circuit 11 takes its samples at correspondingly non-linearly related intervals.

As described, the samples of the output waveform of mixer 7 which are subtracted one from the other in circuit 11 relate to two adjacent sweeps of the output frequency of oscillator 1, one in each direction. This is not essential and they may be arranged to relate to, for example, a given frequency sweep in one direction and the frequency sweep in the other direction which preceded the immediately preceding sweep in the other direction, respectively. As a further example they may be derived from the suitably weighted summed versions of the mixer output waveforms produced in response to several recent frequency sweeps in one direction and several recent frequency sweeps in the other direction, respectively.

Because the circuits 11 and 15 of FIG. 2 are essentially linear devices, the order in which they process the output signal of mixer 7 may be reversed if desired. In fact there are three possibilities in this respect: (a) to carry out the requisite time reversal and calculate the differences between the corresponding samples both in the time domain, and then calculate the Fast Fourier Transform of the result (as already described), (b) to carry out the requisite time-reversal in the time domain, calculate the Fast Fourier Transform of the result, and subtract the Fast Fourier Transforms obtained for successive frequency sweeps one from the other, i.e. in the frequency domain, and (c) to calculate the Fast Fourier Transforms of the output waveforms of mixer 7 for successive sweeps, then carry out the requisite time reversal and subtraction of the results, both in the frequency domain. (Time reversal in the frequency domain means in practice the addition of phase to the phase of each relevant spectral component at the output of circuit 15, the added phase being proportional to frequency and the proportionality factor being determined by the duration of the frequency sweep of oscillator 1 from which the relevant spectral components are derived).

Figure 4:
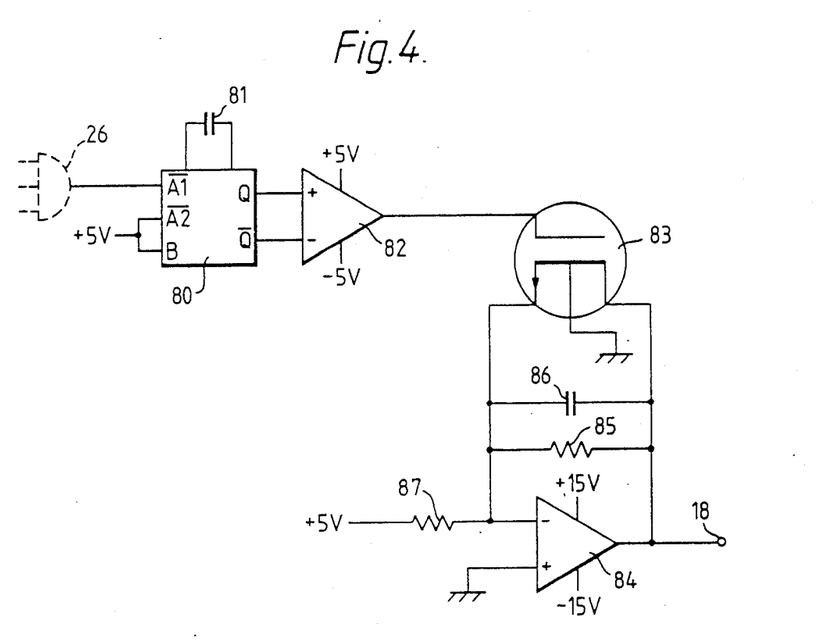
FIG. 4 shows a possible alternative to part of the construction shown in FIG. 2.

If generator 19 of FIG. 1 is a sawtooth-wave generator a possible construction for the signal sampling, storage and differencing circuit 11 and generator 19 is obtained by modifying the construction shown in FIG. 2 by (a) removing the complementer 32, i.e. connecting the output QD of counter 22 directly to the inputs A0 of RAMs 33 and 34, the output QA of counter 23 directly to the inputs A1 of RAMs 33 and 34 and the output QB of counter 23 directly to the inputs A2 of RAMs 33 and 34 and (b) replacing the components 25 and 27–31 by the arrangement shown in FIG. 4. The arrangement shown in FIG. 4 comprises a monostable multivibrator 80 which is provided with a timing capacitor 81 and an (active low) trigger input $\overline{A1}$ of which is fed from the NAND gate 26 of FIG. 2. Multivibrator 80 may be of the type 74121, in which case its other active low trigger input $\overline{A2}$ and its active high trigger input B may be connected to logic "1" as shown. The non-inverting and inverting outputs Q and $\overline{Q}$ of multivibrator 80 are connected to the non-inverting and inverting inputs respectively of an operational amplifier 82 the output of which is connected to the gate of an N-channel, insulated gate, field-effect transistor 83. The source and drain of transistor 83 are connected to the inverting input and the output respectively of an operational amplifier 84 and its substrate is connected to ground. The inverting input and output of amplifier 84 are also interconnected by the parallel combination of a resistor 85 and a capacitor 86, and the non-inverting input of amplifier 84 is connected to ground. The arrangement 84, 85 and 86 therefore constitutes, in conjunction with a resistor 87 connected to the inverting input of amplifier 84, an integrator circuit similar to that formed by components 27, 28, 30 and 31 of FIG. 2, the output of amplifier 84 constituting the output 18 of FIG. 1. However, in FIG. 4 the input series resistor 87 is fed from a constant potential point (+5 volts) so that any ramp appearing at output 18 always has the same (negative-going) direction. Each such ramp is terminated, and the initial condition on output 18 is restored, by the output of gate 26 going low, this giving rise to a short output pulse from multivibrator 80 and hence to momentary conduction by transistor 83 (which effectively constitutes a switch for discharging capacitor 86). Thus a new ramp at output 18 is started each time the count in counter 22, 23 of FIG. 2 becomes 56 or 120.

The various components of FIG. 4 may be of the following types or values:

Multivibrator 80—74121
Capacitor 81—470 pF
Amplifiers 82 and 84—NE536
Transistor 83—BSV 81
Resistor 85—10 Mohms
Capacitor 86—10 nF
Resistor 87—100K ohms.

We claim:

1. A moving target indication system comprising an aerial for transmitting a signal, a variable-frequency oscillator having an output coupled to the aerial, means for repeatedly sweeping the output frequency of said oscillator in opposite directions between first and second values, a mixer circuit having a first input to which the output of said oscillator is coupled and having a second input coupled to an aerial for receiving reflections of the transmitted signal from any targets, and a signal storage and processing arrangement having an input to which an output of the mixer circuit is coupled, said signal storage and processing arrangement comprising means for producing an output signal which is representative of any waveforms which would be obtained by subtracting from each other waveforms produced by the mixer circuit arising from the sweeps of the oscillator frequency between said first and second values in the one direction and waveforms produced by the mixer circuit arising from the sweeps of the oscillator frequency between said first and second values in the opposite direction after the latter waveforms have been put into time-reversed form, said output signal having a frequency representing the range of a respective moving target, and having a modulated amplitude which varies at a rate representing the radial velocity of said target.

2. A system as claimed in claim 1, wherein said signal storage and processing arrangement comprises signal sampling, storage and differencing means for periodically sampling the input waveforms to the arrangement arising from alternate sweeps of the oscillator frequency, storing the samples thus taken, correspondingly periodically sampling the input waveforms to the arrangement arising from the other sweeps of the oscillator frequency, and calculating the differences between the samples taken for each said other sweep and the stored samples taken for the immediately preceding sweep in such manner that each difference is calculated from samples which arose from the same frequency being applied to the first input of the mixer, and Fast Fourier Transform calculating means for processing said differences.

3. A system as claimed in claim 1 or 2, wherein the means for repeatedly sweeping the oscillator output frequency comprises a triangular-wave generator having an output coupled to a frequency control input of the oscillator.

* * * * *